United States Patent
Buer

(10) Patent No.: US 11,994,595 B2
(45) Date of Patent: May 28, 2024

(54) SYSTEMS AND METHODS FOR DETERMINING ORIENTATION OF AN ELECTRONICALLY STEERABLE ANTENNA

(71) Applicant: VIASAT, INC., Carlsbad, CA (US)

(72) Inventor: Kenneth V. Buer, Bluff City, TN (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/549,566

(22) PCT Filed: Mar. 8, 2021

(86) PCT No.: PCT/US2021/021415
§ 371 (c)(1),
(2) Date: Sep. 7, 2023

(87) PCT Pub. No.: WO2022/191820
PCT Pub. Date: Sep. 15, 2022

(65) Prior Publication Data
US 2024/0094405 A1 Mar. 21, 2024

(51) Int. Cl.
*G01S 19/13* (2010.01)
*G01S 13/74* (2006.01)

(52) U.S. Cl.
CPC .............. *G01S 19/13* (2013.01); *G01S 13/74* (2013.01)

(58) Field of Classification Search
CPC ................................. G01S 19/13; G01S 13/74
USPC ........................................................ 342/359
See application file for complete search history.

(56) References Cited

U.S. PATENT DOCUMENTS

| 6,034,634 | A | 3/2000 | Karlsson et al. |
| 6,078,284 | A | 6/2000 | Levanon |
| 6,400,927 | B1 | 6/2002 | Daniel et al. |
| 7,146,192 | B2 | 12/2006 | Cooper et al. |
| 8,890,757 | B1 * | 11/2014 | Macy ............. H01Q 19/04 343/766 |
| 9,625,573 | B2 | 4/2017 | Whelan et al. |
| 9,673,888 | B2 | 6/2017 | Davis |

(Continued)

FOREIGN PATENT DOCUMENTS

CN 208127412 U * 11/2018 ............. H01Q 1/364

OTHER PUBLICATIONS

International Search Report completed by European Patent Office for Application No. PCT/US2021/021415, dated Nov. 21, 2021.

(Continued)

*Primary Examiner* — Harry K Liu
(74) *Attorney, Agent, or Firm* — HOLZER PATEL DRENNAN

(57) ABSTRACT

Determination of a set physical orientation of an electronically steerable satellite antenna using received signals at the satellite antenna is described. The set physical orientation of the satellite antenna may be static for the antenna. In turn, the antenna may scan a beam through a range of angles to measure signal strength of signals from transmitters (e.g., satellites) to determine a direction of incidence of the signals. The direction of incidence of the signals from corresponding known orbital locations of the satellites allow the satellite antenna to determine the set physical orientation to a high degree of precision. Specifically, the high degree of precision allows avoidance angles to non-target satellites to be minimized to allow more efficient antenna operation with fewer interference mitigation operations.

24 Claims, 8 Drawing Sheets

(56) References Cited

U.S. PATENT DOCUMENTS

| | | |
|---|---|---|
| 2002/0142781 A1 | 10/2002 | Wiedeman et al. |
| 2006/0035588 A1 | 2/2006 | Chapelle |
| 2011/0169688 A1* | 7/2011 | Wyler ................. H04B 7/2041 |
| | | 342/354 |
| 2019/0293806 A1 | 9/2019 | Haley et al. |
| 2021/0006326 A1 | 1/2021 | Cross et al. |
| 2021/0088651 A1* | 3/2021 | Neto ..................... H01Q 1/081 |

OTHER PUBLICATIONS

Levanon, Nadal , "Quick Position Determination Using 1 or 2 LEO Satellites", IEEE Transactions on Aerospace and Electronic Systems; vol. 34, No. 3, Jul. 1998, 736-754.

\* cited by examiner

SYSTEMS AND METHODS FOR DETERMINING ORIENTATION OF AN ELECTRONICALLY STEERABLE ANTENNA

BACKGROUND

Satellite communication systems may include satellites in geosynchronous Earth orbit (GEO) to facilitate communication between a user terminal on Earth and the GEO satellites. GEO satellites have an orbital period equal to the rotational period of the Earth. As such, GEO satellites may be geostationary or quasi-geostationary such that GEO satellites generally appear stationary or cycle through a very limited range of motion in the sky relative to a user terminal. In the case of geostationary GEO satellites, the orbit is directly above the equator of the Earth. Thus, aiming of a satellite antenna at a user terminal may be relatively straightforward as the aiming of a satellite antenna may be static without the need to re-aim or vary the direction of the antenna. Furthermore, as the aiming of the satellite antenna is static, interference with other satellites may be negligible.

However, as GEO satellites in geostationary orbits are located above the equator, a limited number of "slots" or spatial availabilities in the geostationary orbit are available. In addition, GEO satellites orbit the Earth at a relatively high altitude, which creates high latency in signals transmitted between the Earth and GEO satellites. Such high latency is disadvantageous, especially in certain time sensitive data contexts. As a result of unavailability of geostationary orbital slots, the desire to provide a satellite communication system with reduced latency, and other constraints on GEO satellites, satellite communication systems may additionally or alternatively use low Earth orbit (LEO) or mid-Earth orbit (MEO) satellites to facilitate communication with user terminals. LEO and MEO satellites and/or orbits may be collectively referred to as non-geosynchronous (non-GEO) herein.

Because non-GEO satellites have orbital periods that are not equal to the rotational period of the Earth, non-GEO satellites do not appear stationary in the sky relative to a user terminal. User terminals for communication with non-GEO satellites typically employ some form of tracking that allows a satellite antenna at the user terminal to target a non-GEO satellite as the non-GEO satellite transits through the sky relative to the user terminal through movement of the satellite antenna and/or a beam of the satellite antenna. While tracking capabilities add to the complexity of the user station, the ability to use non-GEO satellites for communication with the user terminal provide benefits that counter the additional complexity of the Guser terminal. However, drawbacks regarding use of non-GEO satellites exist that are preferably mitigated. In particular, when tracking a non-GEO satellite using a satellite antenna at a user terminal, it may be advantageous (e.g., to maintain operational status or to avoid violations of licensing regimes) to avoid interference with other satellites present in the sky relative to a user terminal.

SUMMARY

The present disclosure relates to determining an orientation of an electronically steerable satellite antenna relative to the Earth to, for example, more precisely determine interference angles relative to non-target satellites to assist in more efficiently avoiding interference with the non-target satellites. The present disclosure allows for the orientation of an electronically steerable antenna to be resolved to a high level of accuracy and precision. As such, operations of the user terminal may experience improved performance through reduced interference mitigation operations. Specifically, with precise orientation determination, a radiation pattern of the satellite antenna may be precisely modeled such that error margins for avoidance angles relative to non-target satellites may be reduced for a satellite antenna at a user terminal.

The present disclosure generally determines a set physical orientation of an electronically steerable satellite antenna based on triangulation using received signals from a plurality of transmitters (e.g., one or more satellites). By determining a direction of incidence of the received signals from the plurality of transmitters, an antenna system may resolve the set physical orientation of the antenna. Because the receipt of the signals may be performed autonomously by the antenna system, the set psychical orientation may be resolved without intervention of a user or technician (e.g., without requiring a user to physically measure the orientation of the antenna).

In view of the foregoing, the present disclosure facilitates determining a set physical orientation of an electronically steerable satellite antenna for use in a satellite communication system. The present disclosure includes determining a location of the electronically steerable satellite antenna relative to Earth. A plurality of signals are received from at least two different respective satellites in known orbital locations relative to the Earth. To clarify, a plurality of signals are received, different respective one of which may be received from at least two different orbital locations relative to the antenna. The receipt of the signals may include electronically steering the electronically steerable satellite antenna (e.g., steering a beam of the electronically steerable satellite antenna) to determine a direction of incidence of each of the plurality of signals with respect to the electronically steerable satellite antenna. In turn, a set physical orientation of the electronically steerable satellite antenna relative to the Earth is calculated based on the position of the electronically steerable satellite antenna and the directions of incidence of each of the signals from the satellites. The set physical orientation comprises an azimuth angle, an elevation angle, and a rotation of a boresight direction of the electronically steerable satellite antenna relative to the Earth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
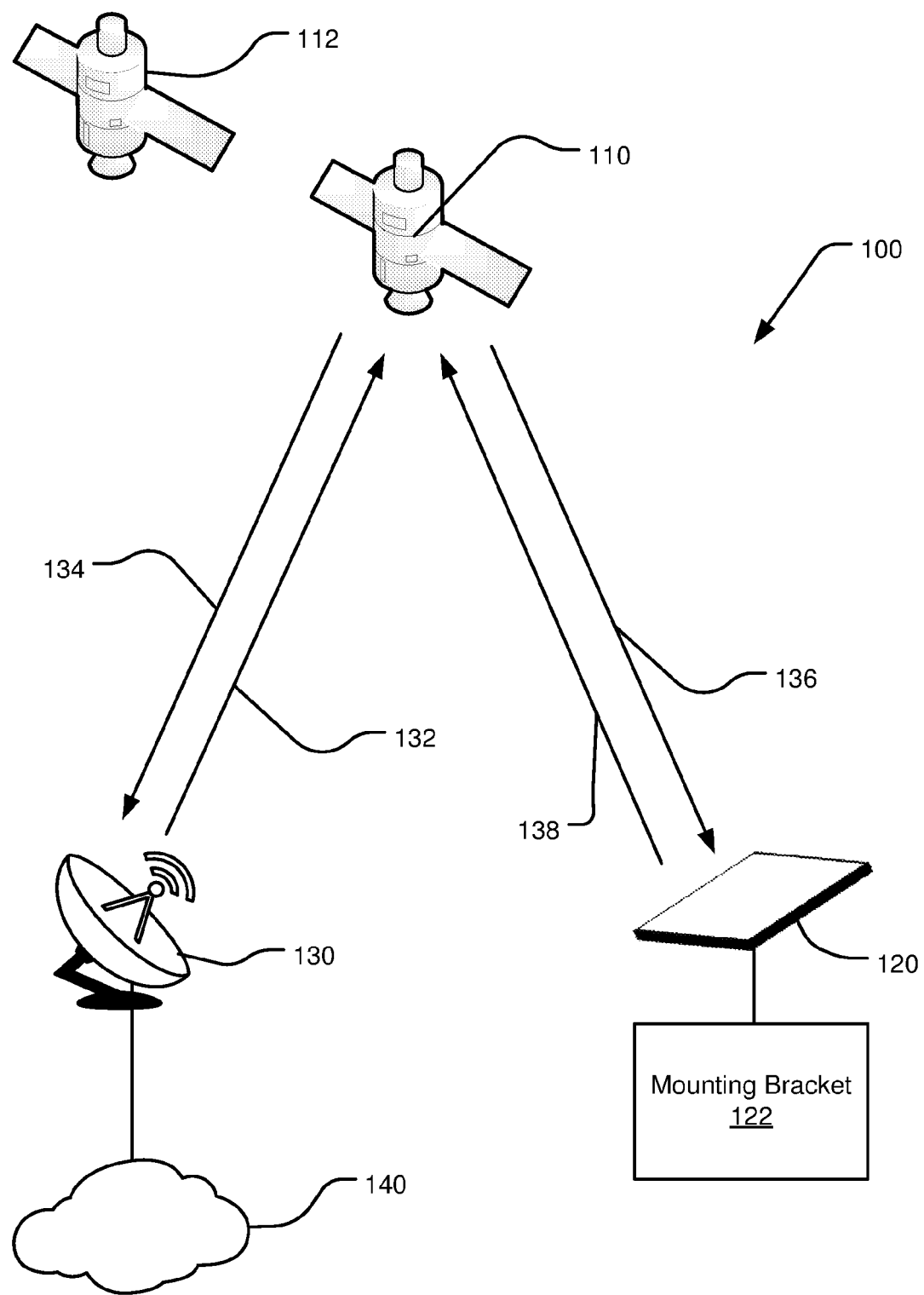
FIG. 1 illustrates an example of a satellite communication system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present disclosure relates to approaches that improve satellite antenna performance or a user terminal in a non-GEO satellite communication system. The present disclosure recognizes the benefits of utilizing an electronically steerable satellite antenna to track one or more non-GEO satellites as the non-GEO satellite transits in the sky relative to the user terminal. For instance, use of an electronically steerable satellite antenna may avoid the need to provide complex, costly, and failure-prone mechanical tracking mechanisms to physically move a satellite antenna. Rather, the steerable satellite antenna may be installed in a set physical orientation and the electronically steerable satellite antenna may be controlled to directionalize a beam for reception and/or transmission of signals. Electronically steerable satellite antennas may therefore provide a directionalized beam for transmission and/or reception of signals. While reference is made herein to a beam or radiation pattern being steerable, such usage is intended to relate generally to the antenna's beam for ability to either directionalize transmission of signals or directionalize sensitivity to reception of signals at the antenna through a given scan angle relative to the boresight direction of the antenna. That is, description of a steered or directionalized beam or radiation pattern is not intended to be limited to the transmission of signals from the antenna, but rather may also refer to controlling a direction of the sensitivity of the antenna for reception of signals as well.

The set physical orientation of the satellite antenna may be precisely and accurately determined according to the approaches described herein. Determining the set physical orientation of the antenna may allow the radiation pattern of the satellite antenna to be monitored for interference mitigation with non-target satellites. With the improved precision provided by the approaches described herein, reduced tolerances or margins of error may be provided for avoidance angles relative to non-target satellites. In turn, antenna performance is improved by potentially reducing the number of interference mitigation operations required to avoid interference with other satellites (e.g., in the GEO arc or in other non-GEO arcs).

Interference events may refer to situations in which the radiation beam pattern of a transmitted signal from the satellite antenna reaches a threshold in relation to beam power within an avoidance angle relative to a non-target satellite. The threshold may be related to a maximum amount of interference allowable to maintain operation of the non-target satellite. For instance, in non-GEO satellite communication systems, satellite antennas of user terminals may be required to avoid directing signals toward the GEO arc so as to reduce or eliminate any interference to GEO stationary communication satellites that operate in the same frequency bands as the non-GEO satellite communication system. Interference may also occur with respect to non-target non-GEO satellites (e.g., senior licensed satellites or the like). Specifically, an avoidance angle may be defined relative to a non-target satellite or the GEO arc that defines an extent over which radiation from the satellite antenna may not exceed some threshold value (e.g., which may be predefined according to operation parameters, defined by government regulation, or subject to licensing requirements).

As a result user terminals may be required to perform an interference mitigation operation (e.g., mute a transmission of the antenna, reduce antenna power for a transmission, or point to a different satellite for transmission of signals, etc.) during times when a target satellite crosses into an avoidance angle relative to the GEO arc or relative to a non-target satellite. As this is inconvenient for system operation, it is desirable to minimize the avoidance angle with respect to either the GEO arc or other non-GEO arcs as much as possible in order to maximize the utility of the non-GEO satellite system.

As noted above, the avoidance angle relates to a range of angles over which the non-GEO user terminal needs to avoid transmission of signals to avoid interference (e.g., maintain antenna transmit power at or below a threshold) with a non-target satellite. An avoidance angle may apply to both the main beam emissions of a satellite antenna as well as in relation to off-axis emissions of the satellite antenna. Such off-axis emissions may be referred to as side lobes of the radiation pattern. Typically, an avoidance angle includes a margin of error in order to ensure the interference requirements are satisfied (e.g., transmitted radiation from the satellite antenna stays at or below a threshold value within the extents of an avoidance angle). The errors compensated for by the margin of error can arise because the beam width of the antenna, and hence the amount of interference produced, depends on the physical orientation of the antenna. For example, the satellite antenna may be oriented relative to multiple degrees of freedom (e.g., azimuth, elevation, and rotation) in its own the coordinate system. The satellite antenna may have a beam width that varies with scan angle from a boresight direction of the antenna. Thus, two satellite antennas installed at the same location, but having boresight directions oriented in different directions, will have different beam widths when communicating with the same target satellite. In addition, the satellite antenna may have a noncircular aperture that results in an asymmetric beam with a narrow beam width axis and a wide beam with axis. The composite beam width directed towards a non-target satellite (and therefore the amount of interference) thus depends on the rotation of the installed satellite antenna. Furthermore, in some contexts, the radiation transmit power associated with a side lobe of the radiation pattern may reach a threshold value within an avoidance angle. Therefore, off-axis emissions may also be subject to interference within avoidance angles of non-target satellites.

An avoidance angle is unique for each satellite antenna because of the location of the antenna on the Earth and the specific orientation of the antenna. The location of the antenna (e.g., described using latitude, longitude, and elevation) can be observed at installation or obtained from a local GPS receiver, but the precise antenna orientation (e.g., to a precision of far less than 1 degree in rotation, elevation, and azimuth) is not as easy to determine, even if the antenna is professionally installed by a trained technician. Also, even if the antenna is precisely installed and aligned initially, the antenna may move over time due to environmental issues (e.g., weather, geological sinking, earthquakes) or other unintentional disturbances (e.g., being hit by a football or lawnmower for example). Uncertainty of the satellite antenna orientation can add several degrees of error to the avoidance angle and possibly double the avoidance angle in some cases. With larger avoidance angles, more interference events occur, thus reducing antenna performance. As such, by precisely determining the set physical orientation of the satellite antenna, the avoidance angle may be reduced in response to more precise determination of the set physical orientation of the antenna, and interference avoidance mitigation operations may be reduced. As such, the present disclosure presents examples of methods and apparatuses to allow each satellite antenna in a non-GEO satellite communication system to determine its precise orientation regardless of installation precision or changes in orientation over time.

Furthermore, knowing the precise orientation of a satellite antenna has advantages in coordination activities for efficient spectrum sharing with other non-GEO systems. In cases where non-GEO systems have spatial separation, each system can use all the available spectrum without interference. When there are in-line events, the spectrum must be shared. Accordingly, minimizing the avoidance angle with other non-GEO systems also has significant advantages in capacity and speed of all non-GEO systems that share spectrum.

Systems and methods are described herein for precisely determining the orientation of an electronically steerable satellite antenna. In doing so, the avoidance angle relative to non-target satellites can be precisely calculated with reduced margin of error, thereby allowing maximal usage of the satellite antenna. As will be described in greater detail below, the present disclosure generally includes the use of an electronically steerable satellite antenna to receive a plurality of signals from at least two different satellites in known orbital locations relative to the Earth. In one example, one or more of the plurality of signals received by the antenna may comprise beacon signals. In other examples, one or more of the plurality of signals may other types of signals such as communication signals, location signals, or any other type of signal capable of being detected from a satellite in a known orbital location (e.g. based on known or available ephemeris data for the satellite).

In addition, the location of the satellite antenna relative to the Earth may be determined. Using the location of the satellite antenna relative to the Earth and the known orbital locations of the at least two different satellites, directions of incidence of the plurality of signals received at the satellite antenna may be determined. In turn, a determined system of equations may be calculated to resolve the set physical orientation of the satellite antenna comprising an azimuth angle, an elevation angle, and a rotation of the satellite antenna. In connection with receipt of the signals, an automated algorithm may be performed by the antenna to electronically scan the sky for signals from two or more satellite with known positions (e.g., by controlling a direction of a beam of the satellite antenna over a range azimuth and elevation angles). Thus, once at least two signals are found and identified, the satellite antenna can compute a precise and accurate set physical orientation based on the scan angles (e.g., relative to azimuth and elevation) at which the signals were received. This automated algorithm can be repeated as often as necessary over the life of the satellite antenna.

In addition, the present disclosure recognizes that the radiation pattern of an electronically steerable satellite antenna includes a main radiation beam and ancillary beam components sometimes referred to as off-axis emissions or side lobes of the antenna's radiation pattern. In turn, it is important to avoid interference between a main beam and non-target satellites. Precise determination of the set physical orientation of the antenna assists in accurately modeling the main beam pattern for these purposes. In addition, precise determination of the set physical orientation of the antenna is also important to avoid interference caused by side lobes of the radiation pattern. As such, once the set physical orientation of the satellite antenna is determined, a known radiation pattern of the satellite antenna may be correlated to the set physical orientation for use in analyzing interference events of the satellite antenna when radiation within an avoidance angle reaches a threshold.

With reference to FIG. 1, an example of a satellite communication system 100 is depicted according to the present disclosure. The system 100 includes a satellite antenna 120 supported by a mounting bracket 122 to dispose the satellite antenna 120 in a set physical orientation relative to Earth. By set physical orientation, it is meant that the mounting bracket 122 is designed to dispose the antenna 120 in a static physical orientation that does change under normal operational conditions to which the antenna may be exposed including, for example, weather events, geological sinking, earthquakes, incidental physical contact with the antenna 120, or the like. As described in greater detail below, the mounting bracket 122 may establish the set physical orientation of the antenna 120 at an azimuth angle, an elevation angle, and a rotation angle. The azimuth angle, the elevation angle, and the rotation angle may be measured with respect to a local coordinate system for the antenna 120 or a global coordinate system. Moreover, it may be appreciated that the orientation of the antenna 120 may be readily translated between a local and global coordinate system as needed.

In an example, the orientation of the antenna 120 is measured with respect to a boresight direction of the antenna 120. For instance, the antenna 120 may comprise an electronically steerable satellite antenna. In this regard, the antenna 120 may comprise a boresight direction along which the gain of the antenna 120 is the greatest. For a planar phased array antenna, the boresight direction may be a vector normal to the planar phased array surface. While the electronically steerable satellite antenna 120 may be operative to steer a beam (e.g., by controlling a direction of transmission and/or reception sensitivity) relative to the boresight direction (e.g., through a scan angle relative to the boresight direction), the set physical orientation of the antenna 120 may be measured using the boresight direction as a fixed reference datum for the antenna 120.

The antenna 120 may be in bidirectional communication with a satellite (e.g., a target satellite 110) in orbit about the Earth. The target satellite 110 may also be in bidirectional communication with a gateway terminal 130 on the Earth. The gateway terminal 130 may be in communication with a network 140. The gateway terminal 130 is sometimes referred to as a hub or ground station. The gateway terminal 130 includes an antenna to transmit a forward uplink signal 132 to the target satellite 110 and receive a return downlink signal 134 from the target satellite 110. The gateway terminal 130 can also schedule traffic to the antenna 120. Alternatively, the scheduling can be performed in other parts of the satellite communications system 100 (e.g. a core node, satellite access node, or other components, not shown). Communication signals 132, 134 communicated between the gateway terminal 130 and target satellite 110 can use the same, overlapping, or different frequencies as communication signals 136, 138 communicated between the target satellite 110 and the antenna 120.

The network 140 is interfaced with the gateway terminal 130. The network 140 can be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication between devices as described herein. The network 140 can include both wired and wireless connections as well as optical links. The network 140 can connect multiple gateway terminals 130 that can be in communication with target satellite 110 and/or with other satellites.

The gateway terminal 130 can be provided as an interface between the network 140 and the target satellite 110. The gateway terminal 130 can be configured to receive data and information directed to the antenna 120 from a source accessible via the network 140. The gateway terminal 130 can format the data and information and transmit forward uplink signal 132 to the target satellite 110 for delivery to the antenna 120. Similarly, the gateway terminal 130 can be configured to receive return downlink signal 134 from the target satellite 110 (e.g. containing data and information originating from the antenna 120) that is directed to a destination accessible via the network 140. The gateway terminal 130 can also format the received return downlink signal 134 for transmission on the network 140.

The target satellite 110 can receive the forward uplink signal 132 from the gateway terminal 130 and transmit corresponding forward downlink signal 136 to the antenna 120. Similarly, the target satellite 110 can receive return uplink signal 138 from the antenna 120 and transmit corresponding return downlink signal 134 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

As shown in FIG. 1, the satellite communications system 100 also includes another satellite, hereinafter referred to as a non-target satellite 112. Communication of one or more signals between the non-target satellite 112 and the antenna 120 is undesired or unintended. Although only one non-target satellite 112 is illustrated in FIG. 1 to avoid overcomplication of the drawing, the satellite communications system 100 can include many more non-target satellites 112 and the techniques described herein can be used to avoid excessive interference with each of the non-target satellites 112. The non-target satellite 112 may be part of the same satellite constellation as the target satellite 110 or a member of a different satellite constellation. The non-target satellite 112 may be a satellite operated by a different satellite operator than that of the target satellite 110. For instance, in some jurisdictions, licensing regimes or other protocols may provide location information (e.g., ephemeris data) for non-target satellites 112 and may dictate interference protocols including, for example, priority amongst multiple satellites that may be visible to the antenna 120.

The non-target satellite 112 can, for example, be configured as a bent pipe or regenerative satellite. The non-target satellite 112 can communicate one or more signals with one or more ground stations (not shown) and/or other terminals (not shown).

The antenna 120 may include a control system to control communication with the target satellite 110, while also avoiding excessive interference with the non-target satellite 112. An example of such an antenna system is described in more detail below.

As used herein, interference with the non-target satellite 112 can refer to uplink interference and/or downlink interference. Uplink interference is interference to the non-target satellite 112 caused by a portion of the return uplink signal 138 transmitted by the antenna 120 that is received by the non-target satellite 112. Downlink interference is interference to the antenna 120 caused by a portion of a signal transmitted by the non-target satellite 112 that is received by the antenna 120.

The non-target satellite 112 may be a GEO satellite in the GEO arc relative to the antenna 120. Moreover, interference with a GEO arc relative to the antenna 120 may be avoided regardless of identification of any specific GEO satellite in the GEO arc. Alternatively, the non-target satellite 112 may be a non-GEO satellite whose orbital location information may be provided by ephemeris data. In one example, the target satellite 110 may be a LEO satellite and the non-target satellite 112 may be a GEO satellite. In some embodiments, the non-target satellite 112 may comprise a plurality of GEO satellites in the GEO arch in which GEO satellites are distributed. In alternative embodiments, one or both of the target satellite 110 and the non-target satellite 112 can be LEO satellites. The non-target satellite 112 can for example be adjacent to the target satellite 112. As used herein, the target satellite 110 and the non-target satellite 112 are "adjacent" if the effective angular separation between them as viewed at antenna 120 is less than or equal to 10 degrees. In this regard, an avoidance angle for an adjacent non-target satellite may be larger than the actual angular separation to provide a margin of error to avoid interference.

Figure 2:
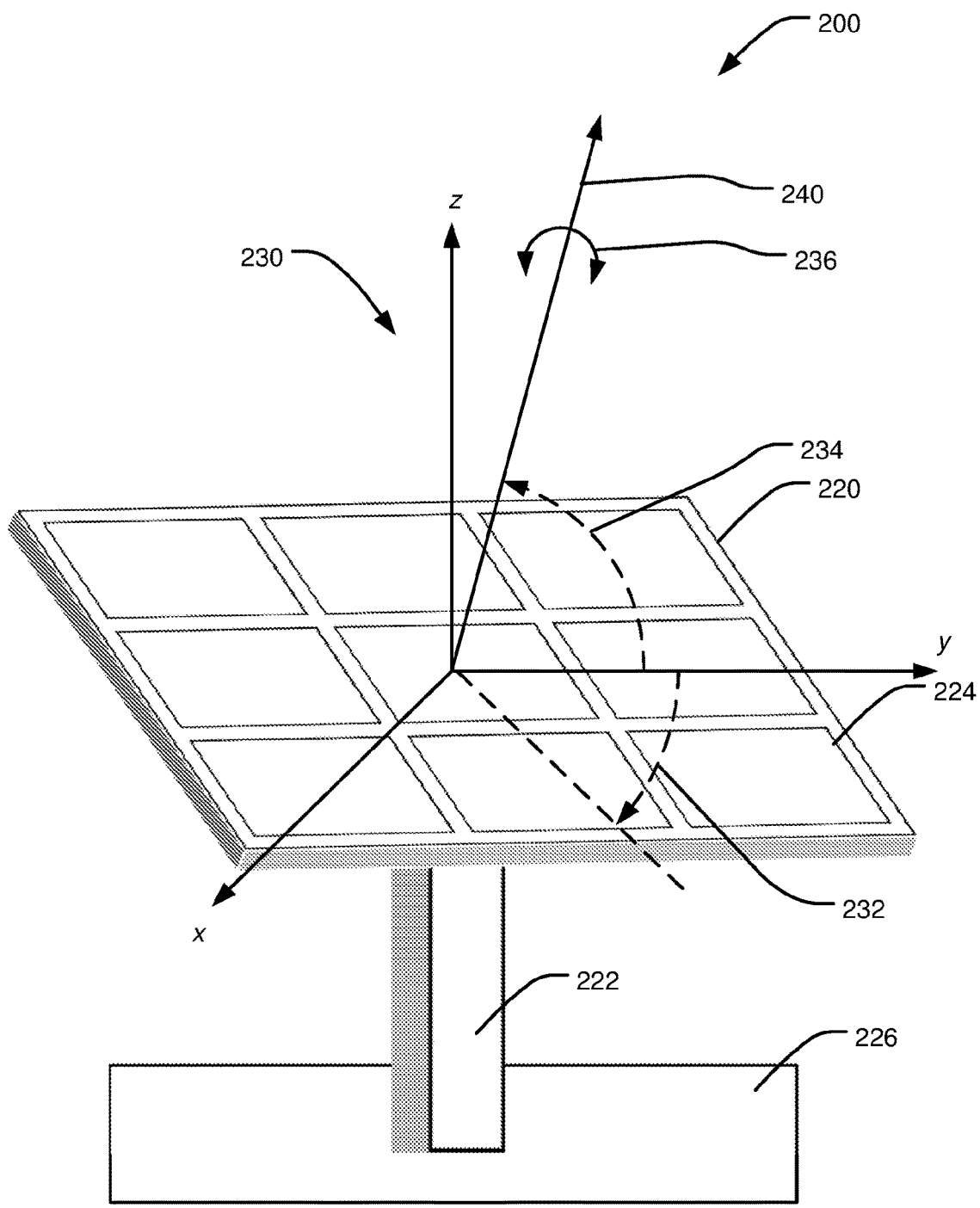
FIG. 2 illustrates an example of an electronically steerable satellite antenna according to the present disclosure in relation to a local coordinate system.

With further reference to FIG. 2, an example of an antenna 200 is shown in greater detail. The antenna 200 may comprise an electronically steerable satellite antenna such as phased array antenna or the like. In other examples, other electronically steerable satellite antennas other than phased array antennas may be provided without limitation. For instance, the electronically steerable satellite antenna may comprise an antenna having a liquid crystal polymer based aperture, an antenna having a counter rotating aperture coupled slotted plates, an antenna utilizing barium strontium titanite or other similar voltage dependent dielectric material, or a metamaterial based antenna. In one example, the antenna 200 may include a plurality of antenna elements 224. The plurality of antenna elements 224 may comprise an antenna array and beamforming circuitry (e.g., phase shifters, amplifiers, etc.) that may be controlled collectively to provide a steerable beam. The steerable beam may allow for directionalized reception of signals and/or directionalized transmission of signals in the direction of the steered beam without limitation. While a rectangular array of rectangular antenna elements 224 is depicted in FIG. 2, it may be appreciated that any configuration, shape, and/or array of antenna elements 224 may be provided without limitation (e.g., including antenna elements 224 of a different shape such as triangular, hexagonal, octagonal, or other polygon shape in any appropriate array layout without limitation).

The antenna 220 may be supported by a mounting bracket 222. In turn, the mounting bracket 222 may be secured to a base 226. The base 226 may be a permanent or static structure relative to the Earth. For instance, the base 226 may comprise an installation pad, a building, or any other static structure. The mounting bracket 222 may provide one or more degrees of freedom for the antenna 220 to set the physical orientation of the antenna 220. In one example, the mounting bracket 222 may provide at least three degrees of freedom in which the azimuth angle, elevation angle, and rotation angle of the antenna 220 may be adjusted. Regardless of the adjustability of the mounting bracket 222, the mounting bracket 222 may be secured to position the antenna 220 in a set physical orientation. As described above, the set physical orientation may be static such that operational conditions to which the antenna 220 is exposed may not move the antenna 220.

FIG. 2 illustrates an example coordinate system 230 in which the set psychical orientation of the antenna 220 may be described. The coordinate system 230 may include an x-axis, a y-axis, and a z-axis defining a local three dimensional coordinate system relative to the antenna 220. A boresight direction 240 of the antenna 220 may be positioned in the coordinate system 230. As described above, a boresight direction 240 of the antenna 220 describes an axis of maximum gain for the antenna 220. In the case of an electronically steerable satellite antenna, while the beam may be steerable without physical movement of the antenna 220 through a scan angle relative to the boresight direction 240

The boresight direction 240 may be described in the coordinate system 230 by an azimuth angle 234, an elevation angle 232, and a rotation angle 236 as shown in FIG. 2. As the coordinate system 230 may be static in a reference frame relative to the Earth, the azimuth angle 234, the elevation angle 232, and the rotation angle 236 may fully describe the set physical orientation of the antenna 220 relative to the Earth. That is, the azimuth angle 234, the elevation angle 232, and the rotation angle 236 may be translated between a local coordinate system (e.g., coordinate system 230) and a global coordinate system relative to the Earth.

When installing or configuring the antenna 220, it may be possible to approximate the set physical orientation of the antenna 220. However, such approximation may introduce inaccuracies or imprecision which may affect the performance of the antenna by resulting in greater margins of error for interference angles. For example, with relatively low precision measurements of the set physical orientation of the antenna 220, tolerances on avoidance angles regarding interference mitigation may be required to be increased to acceptably reduce the risk of interference with a non-target satellite as described above. Thus, even if an antenna 220 is installed by a technician with training on installation and measurement, the precision that may be achieved in such measurements may be not be satisfactory to precisely determine interference events without degradation of antenna performance. Moreover, often times antennas 220 are installed and/or configured by non-trained users such as homeowners or other end-users without training on orientation or measurement of orientation. As such, it is advantageous to provide automated measurement of the set physical orientation of an antenna 220 using the process described in greater detail below.

Figure 3:
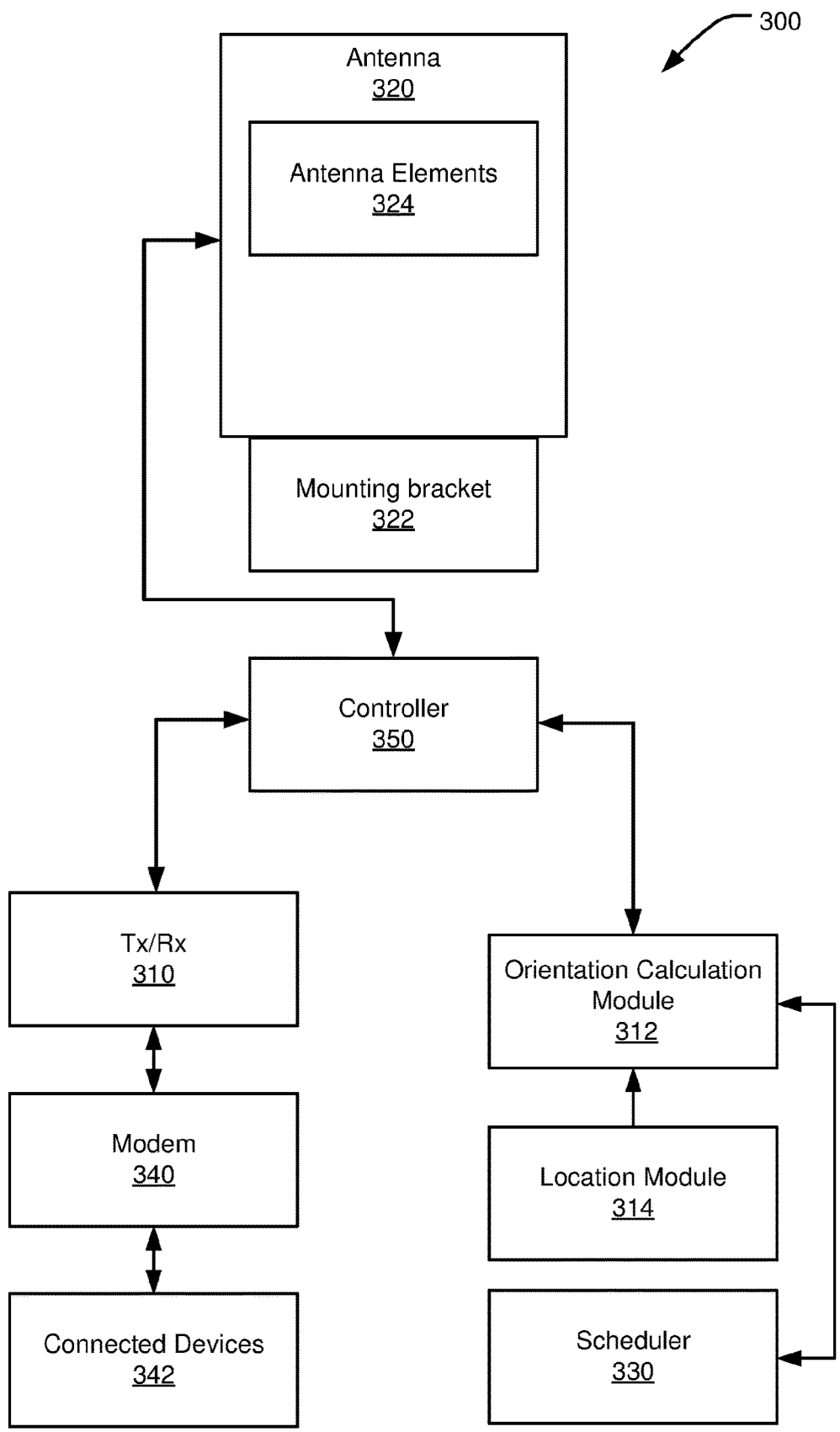
FIG. 3 illustrates a schematic view of an antenna system for a user terminal.

FIG. 3 presents a schematic representation of an antenna system 300. An antenna 320 is schematically illustrated with antenna elements 324 and as being supported by a mounting bracket 322. In this regard, the antenna 320 may correspond to the forgoing description of the antenna 220 described above.

The antenna 320 may be in communication with an antenna controller 350. The antenna controller 350 may be in operative communication with a transceiver 310. The transceiver 310 may coordinate with the antenna controller 350, which may include control circuitry or other means for controlling the operation of the antenna 320 to facilitate communication with a target satellite (not shown in FIG. 3). For example, the transceiver 310 may direct the antenna controller 350 to control the antenna elements 324 to steer a beam of the antenna 320 through scan angles with respect to azimuth angles and elevation angles relative to the antenna 320. Such control of the antenna elements 324 may allow the beam of the antenna to be directed through the range of scan angles relative to the boresight direction of the antenna.

The transceiver 310 may amplify and then downconvert a forward downlink signal (as shown in FIG. 1) from a target satellite to generate an intermediate frequency (IF) receive signal for delivery to a modem 340. Similarly, the transceiver 310 may upconvert and then amplify an IF transmit signal received from modem 340 to generate the return uplink signal (as shown in FIG. 1) for delivery to a target satellite. In some embodiments in which a target satellite operates in a multiple spot beam mode, the frequency ranges and/or the polarizations of the return uplink signal and the forward downlink signal may be different for the various spot beams. Thus, the transceiver 310 may be within the coverage area of one or more spot beams, and may be configurable to match the polarization and the frequency range of a particular spot beam. The modem 340 may for example be located inside the structure to which the antenna 320 is attached. As another example, the modem 340 may be located on the antenna 320, such as being incorporated within the transceiver 310. In any regard, the transceiver 310 may receive and send signals via the antenna 320 to provide communication capability of the modem 340 (e.g., to facilitate access between the modem 340 and a network). That is, the modem 340 respectively modulates and demodulates the IF receive and transmit signals to communicate data with a router (not shown). The router may for example route the data among one or more connected devices 342, such as laptop computers, tablets, mobile phones, etc., to provide bidirectional data communications, such as two-way Internet and/or telephone service.

The antenna controller 350 may also be in communication with an orientation calculation module 312. The orientation calculation module 312 may comprise a processor in operative communication with a memory to access machine readable instructions for executing an algorithm for controlling the antenna 320 to determine the set physical orientation of the antenna 320. In turn the orientation calculation module 312 may resolve an orientation of the antenna 320 as described in greater detail below.

The orientation calculation module 312 may be in communication with a location module 314. The location module 314 may be operative to determine the location of the antenna 320 (e.g., as described by latitude, longitude, and elevation). In turn, the location module 314 may provide the location of the antenna 320 to the orientation calculation module 312 for use in determining the set physical orientation of the antenna 320. The location module 314 may, for example, comprise a Global Positioning System (GPS) receiver capable of resolving a location of the antenna 320 on Earth (e.g., relative to a universal coordinate system such as using latitude, longitude, and elevation). Any other appropriate location determining technology may be used by the location module 314 without limitation.

The orientation calculation module 312 may determine a direction of incidence from the received signals from satellites in known orbital locations. As discussed in greater detail below, a scanning operation performed by the electronically steerable satellite antenna may be used to determine a direction relative to the antenna in an initially unknown set physical orientation from which the signals are received from the satellites in known orbital locations. In an example, the orbital locations may be determined by the orientation calculation module 312 utilizing ephemeris data for the satellites. Alternatively, the ephemeris data may be used to remotely determine the orbital location of a satellite such that the location information is communicated to the orientation calculation module 312.

The orientation calculation module 312 may also be in operative communication with a scheduler 330. The scheduler 330 may maintain or receive ephemeris data for target satellites and/or non-target satellites. In this regard, the ephemeris data of the scheduler 330 may be analyzed to identify interference events in which interference thresholds for emitted radiation by the antenna 320 are reached in an avoidance angle. As discussed above, interference events may relate to signals transmitted along the main beam of the antenna 320 or side lobes of the radiation pattern. The scheduler 330 may, in response to an identified interference event, determine an appropriate interference mitigation operation. The interference mitigation operation may include targeting a new target satellite in which interference is avoided. This may require an alternate target satellite of the satellite communication system to be available (e.g., within view of the satellite antenna 320). As such, the interference mitigation operation may alternatively include modifying a characteristic of the beam of the antenna 320. For example, the main beam may be spoiled or the transmit power of the beam reduced, thus potentially reducing the maximum gain of the beam, but also potentially reducing interfering radiation to at or below the threshold value. Further still, transmission characteristics such as the frequency, modulation data rate, error correction encoding, modulation type, encoding, or other characterized may be modified (e.g., in coordination with the target satellite) to mitigate interference with a non-target satellite.

In some examples, one or more of the antenna controller 350, transceiver 310, modem 340, orientation calculation module 312, location module 314, and/or schedule 330 may be integrally provided with the antenna 320 despite being shown as separate modules in FIG. 3 for clarity. Further still, some of the modules recited above may be located remotely from the antenna 320 and/or user terminal associated with the antenna such that the functionality of the module may be facilitated through networked communication (e.g., including communication using communication with a target satellite).

Figure 4:
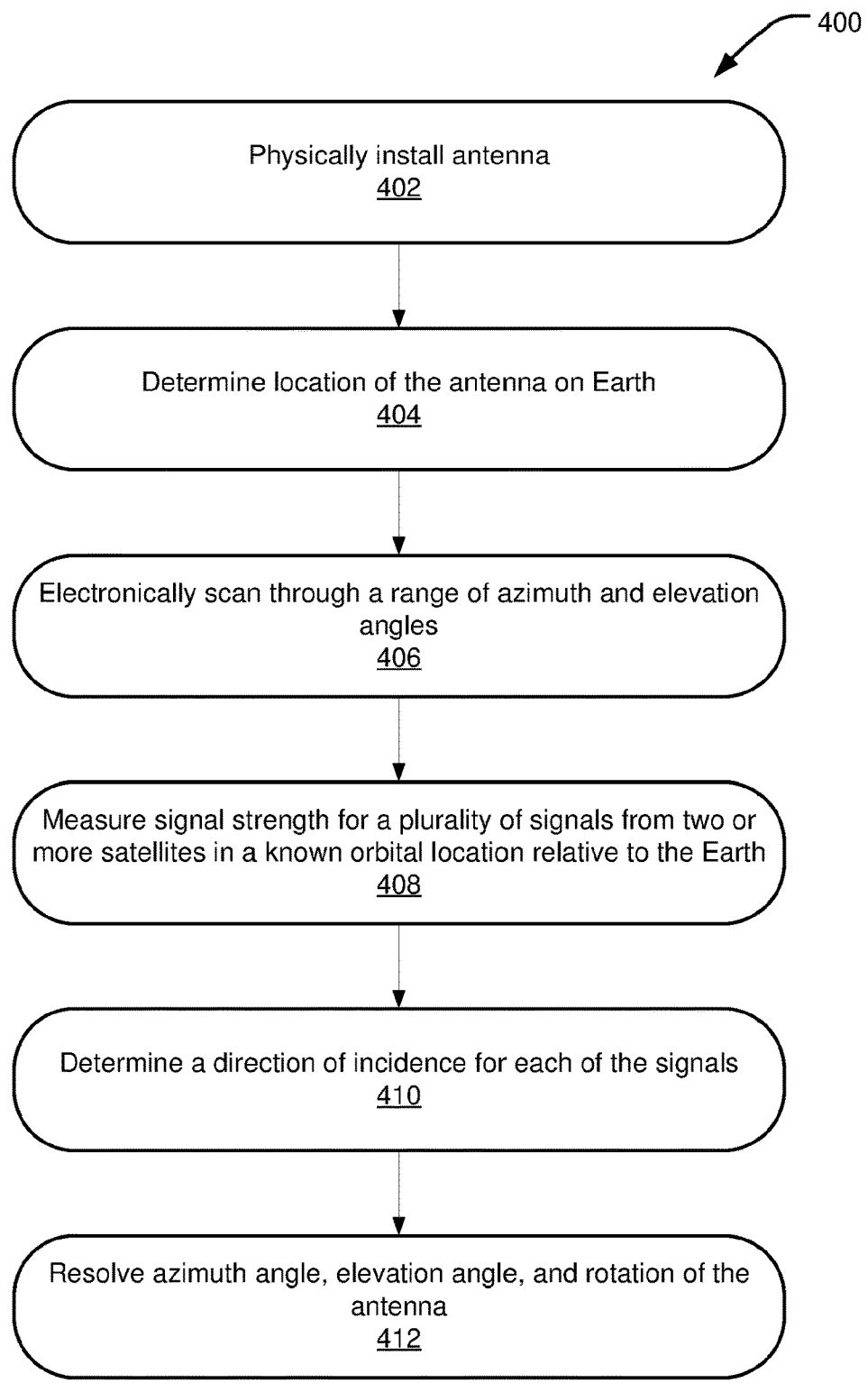
FIG. 4 illustrates example operations for determining a set physical orientation of an electronically steerable satellite antenna.

FIG. 4 illustrates example operations 400 for a process to determine a set physical orientation of a satellite antenna. The operations 400 may include an installation operation 402 in which the satellite antenna is installed in a set physical orientation. As described above, the installation operation 402 may be performed by an end user, trained technician, or some other user. In any regard, the installation operation 402 may include securing the satellite antenna relative to mounting structure to statically dispose the satellite antenna in the set physical orientation.

The operations 400 may also include a location determining operation 404 in which a location of the antenna as installed is determined. As described above, the location determining operation 404 may be performed by a location module. In one example, the location determining operation 404 may include resolving the location of the satellite antenna relative to the Earth using a GPS receiver. This may provide an accurate determination of the latitude, longitude, and elevation of the satellite antenna relative to the Earth.

A scanning operation 406 may be performed in which a steerable beam of the satellite antenna is scanned through a range of azimuth angles and elevation angles. That is, the satellite antenna may have a scan angle describing an angle with respect to the satellite's boresight direction that the steerable main beam may be directed, effectively providing a field of view of the satellite antenna. Concurrently with the scanning operation 406, a measuring operation 408 may measure a received signal strength indicator (RSSI) for one or more signals.

As described above, the signals may comprise beacon signals specifically provided for the purpose of determining a direction of incidence of the signal relative to the antenna. Other types of signals may also be utilized in conjunction with or as an alternative to the one or more beacon signals. For example, a signal may be received from a satellite of the satellite communication system. In such an example, the satellite antenna may be able to receive system control messages either via the reception of a satellite signal or via another communication network. In turn, the satellite antenna may be able to identify the satellite from the system control messages. This function may be provided by the user terminal to acquire and establish communication with a satellite of the satellite system.

Alternatively, if a satellite from outside of the satellite communication system is to be utilized to receive one or more of the plurality of signals, reception of such a signal may be according to publicly available information. For instance, if the satellite is a GPS satellite, the GPS protocol may be publicly available for use in acquiring such a signal and/or determining the location of the satellite in an orbital location (e.g., based on publicly available ephemeris data). If the satellite comprises a third party proprietary satellite outside the satellite commination system, there may be provided public information in the license filings or other public record for such a satellite. This public information may allow the satellite antenna to match frequencies, carrier bandwidth, modulation type, or other signal characteristic that may be referred to as an external signal characteristic. External signal characteristics may be perceptible by a receiver without having to interpret or demodulate a signal. As such, information derived from external signal characteristics may be determined and used to identify a direction of incidence from a satellite in a known location (e.g., based on publicly available ephemeris data) without needing to demodulate or receive messages associated with the signal. Rather, the system may compare external signal characteristics of the signal to a public or otherwise accessible database of those characteristics to uniquely identify the satellite in question.

Moreover, the system may attempt to receive a signal first from satellites within the satellite communication system. If none are available, the system may attempt to receive signals from publicly accessible systems (e.g., GPS signals). Finally, if no satellite communication system signals or publicly accessible signals are available, proprietary third party signals with publicly available external characteristics may be utilized. Further still, in an example, at least one of the signals may be received from a non-satellite transmitter such as an unmanned aerial vehicle (UAV), manned flight platform, balloon, or other transmitter platforms at known locations relative to Earth. In such examples, the location of the non-satellite transmitter may be otherwise known or derived (e.g., using GPS or the like).

In turn, the scanning operation 406 and measuring operation 408 may generate information regarding the signal strength over the scanned angles for a plurality of signals received from two or more satellites. As described above, the satellites may be in known orbital locations relative to Earth. For example, ephemeris data for the satellites may be known or obtained to allow the precise location of the satellites at the time of transmission of the signals to be determined. In any regard, the information regarding the orbital location of the satellites from which the plurality of signals are received may be used in a determining operation 410 in which a direction of incidence is determined for the respective plurality of signals.

In an example, the scanning operation 406 may include scanning the beam of the antenna over a full extent of azimuth and elevation angles to which the beam of the antenna may be steered (e.g., through a full sweep of all scan angles relative to the boresight direction). The scanning operation 406 may include a full power scan in which the beam of the electronically steerable antenna is controlled. In another example, the beam may be broadened such that a broader radiation spread sensitivity is provided with less reception gain. The broader radiation pattern sensitivity with less maximum reception gain may be used to initially scan more quickly over the azimuth and elevation angles of the scan due to the broader radiation spread sensitivity of the beam. Once a signal has been initially located, a subsequent scan may be conducted using a more narrow beam with higher gain in a more limited extent of the azimuth and elevation angle range than as identified by the initial broad-beam scan.

Figure 5:
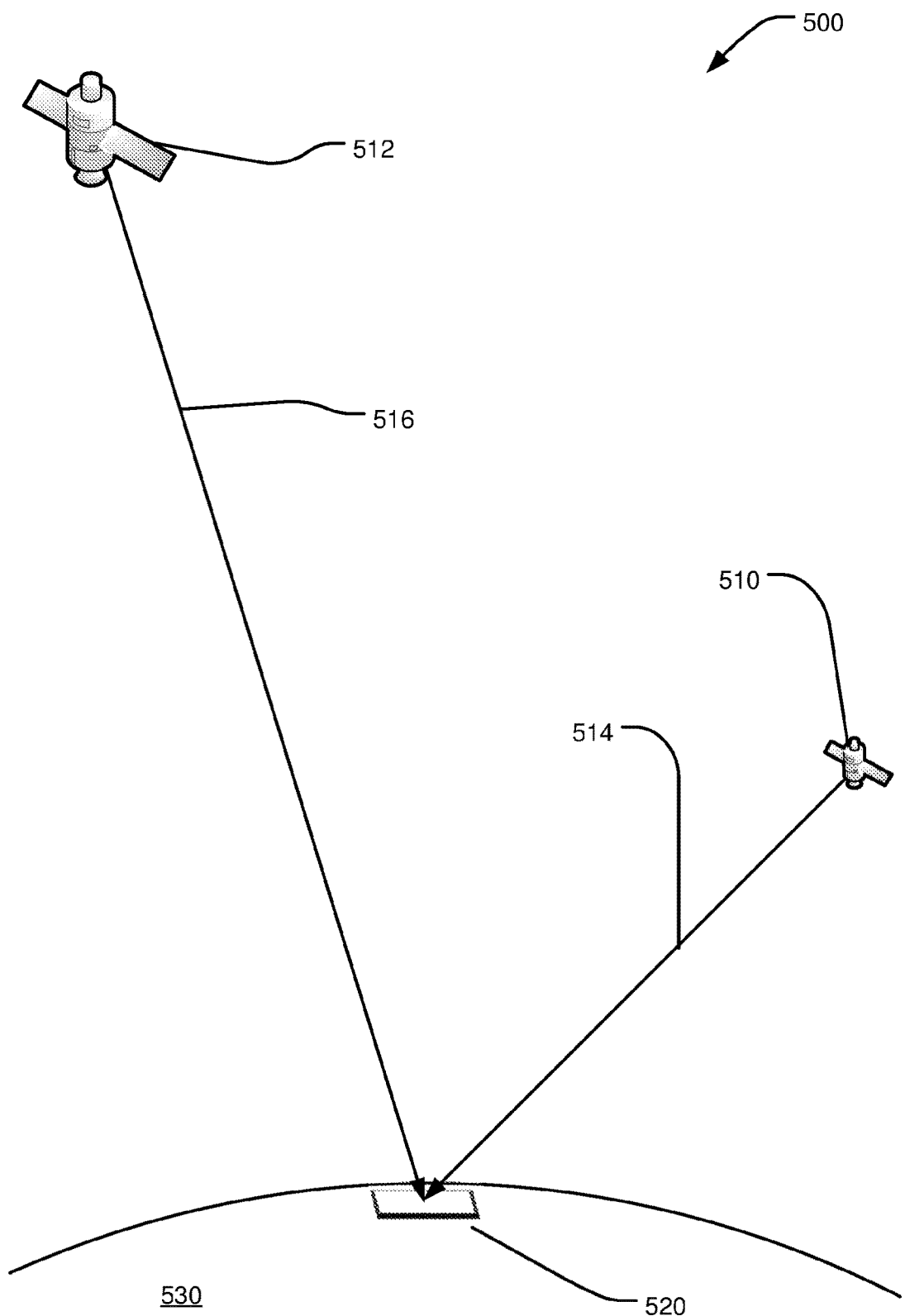
FIG. 5 illustrates an example configuration in which an electronically steerable satellite antenna receives signals from a plurality of satellites.

The receipt of a plurality of signals from one or more satellites is further illustrated in FIG. 5. FIG. 5 illustrates a satellite antenna 520 at a known location on the Earth 530 (e.g., as determined by a GPS receiver). The satellite antenna 520 may be controlled to scan a beam over a range of azimuth and elevation angles. During the course of the scanning, the RSSI for signals 514, 516 may be measured. The signals 514, 516 may be received from at least two different satellites 510, 512 in known orbital locations.

As may be appreciated from the foregoing disclosure, when determining the orientation of the antenna 520, unknown variables include the azimuth angle, the elevation angle, and the rotation of the satellite antenna 520. For these three unknowns, a system of equations may be generated to solve for the three unknowns of the azimuth angle, the elevation angle, and the rotation of the satellite antenna 520. The system of equations may be solved using three inputs related to the unknown angles comprising the orientation of the antenna 520. As such, the known location of the antenna 520 on the Earth may represents a first input. In this regard, two or more signals received at the antenna 520 from satellites 510, 512 at known orbital locations (e.g., using the ephemeris data for the satellites 510, 512) may provide the additional at least two inputs to create a determined equation system to allow for solving for the three unknowns. Therefore, at least two signals 514, 516 may be received. In one example, a signal 514, 516 may be received from each of a plurality of satellites 510, 512 to provide the necessary two inputs to the system of equations to solve for the set physical orientation of the antenna 520. Corresponding directions of incidence for each of the signals may be determined (e.g., based on where the signal strength for the respective beacon signal was greatest during the scan in view of the known location of the satellite antenna 520 on Earth and the known orbital locations of the satellites 510, 512). The directions of incidence for the signals 514, 516 may provide the necessary remaining two inputs to provide a determined system to determine the azimuth angle, elevation angle, and rotation angle for the antenna 520.

As is illustrated in FIG. 5, the two satellites 510, 512 may be in different orbital locations relative to the antenna 520. Use of two different satellites in different orbital locations relative to the antenna 520 may provide improved geometric dilution of precision (GDOP) values. However, it may be possible to measure two or more signals from the same satellite at different times in which the satellite is at different orbital locations to provide sufficient GDOP. In further examples, the satellites 510, 512 may each be GEO satellites at known orbital locations in the GEO arc. In another example, one or both of the satellites 510, 512 may be non-GEO satellites. In the case of non-GEO satellites, ephemeris data for a time at which the signals 514, 516 were transmitted may be available to the antenna 520 to allow for precises orbital location of the non-GEO satellite to be determined at the time the signal 514, 516 is received.

With returned reference to FIG. 4, a resolving operation 412 may include resolving the azimuth angle, elevation angle, and rotation angle for the satellite antenna. The resolving operation 412 may include constructing and/or solving the system of equations described above that utilize the location of the antenna on Earth and the two directions of incidence for the signals received at the antenna from known orbital locations of the respective satellites from which the signals are received as inputs to solve for the three unknown variables of the azimuth angle, elevation angle, and rotation angle for the satellite antenna.

The resolving operation 412 may determine the set physical orientation of the satellite antenna to a precision of less than 1 degree. For example, the resolving operation 412 may determine the set physical orientation of the satellite antenna to a precision of not more than about 0.5 degree, 0.1 degree, or 0.01 degree. In this regard, the precision achieved through the resolving operation 412 based on the received signals at the satellite antenna may far exceed the precision that may be achieved through physical measurement or a user aiming the satellite antenna through manipulation of the satellite antenna relative to a mounting bracket. With the more precise orientation determination, angles of avoidance relative to non-target satellites may be reduced. In turn, the number of interference mitigation operations may be reduced based on the reduce avoidance angles that may be achieved in view of precise satellite antenna orientation determination.

Figure 6:
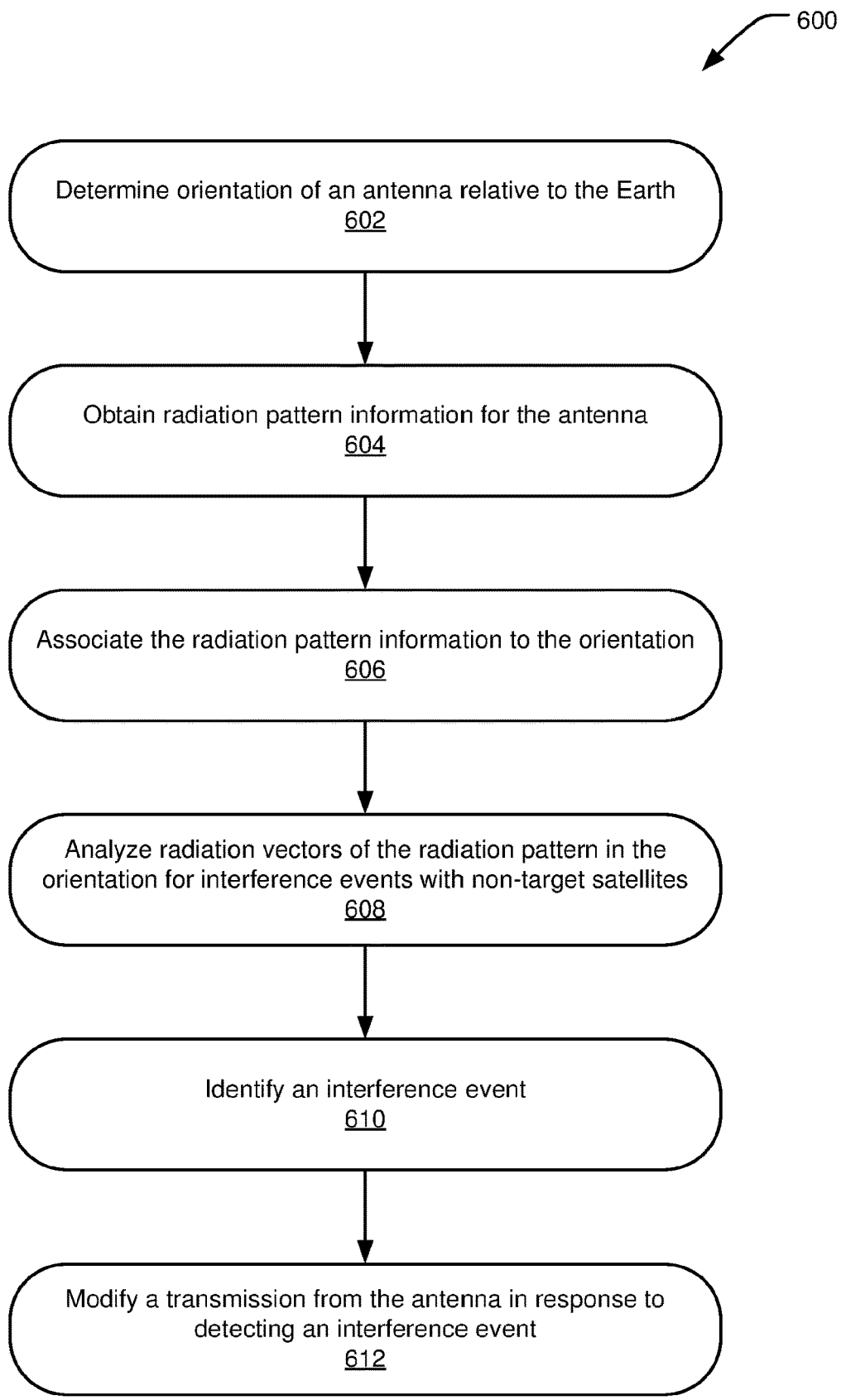
FIG. 6 illustrates example operations for mitigation of interference between an electronically steerable satellite antenna of a user terminal and non-target satellites.

FIG. 6 illustrates example operations 600 for mitigation of interference at an electronically steerable satellite antenna. The operations 600 include a determining operation 602 for determining a set physical orientation of the satellite antenna. The determining operation 602 may include the operations 400 described in relation to FIG. 4 above without limitation.

The operations 600 may also include an obtaining operation 604 to obtain radiation pattern information for the antenna. The radiation pattern information may be received at the antenna or may be determined locally. The information regarding the radiation pattern may comprise a beam pattern emission profile. For instance, for a phased array antenna, known equations may be provided for modelling the radiation pattern of the antenna. Specifically, the beam pattern emission profile of the antenna may be modeled for any direction in which the beam of the antenna is steered through all available scan angles relative to boresight direction for the antenna.

In turn, the operations 600 may also include an associating operation 606 in which the transmit radiation pattern for the antenna is associated with (e.g., aligned relative to) the set physical orientation. For instance, the beam pattern emission profile may be characterized as radiation vectors of various magnitudes relative to the beam direction of the antenna. As the orientation may characterize the boresight direction of the antenna in a global coordinate system relative to the Earth, the associating operation 606 may include translating the radiation pattern to the global coordinate system such that the radiation pattern may be described or expressed in relation to the Earth for any available scan angle of the beam of the antenna.

In turn, the operations 600 may include an analysis operation 608 in which the radiation transmit vectors describing the transmit radiation pattern of the antenna are analyzed to identify any potential interference events. The potential interference events may be determined in relation to the main beam of the radiation pattern and/or one or more side lobes of off-axis emissions. The analysis operation 608 may include ingestion of ephemeris data for non-target satellites and target satellites (e.g., from a scheduler 330). A relative location of a GEO arc to the antenna may be determined and avoidance angles relative thereto may be established. Additionally or alternatively, avoidance angles may be established relative to one or more non-GEO non-target satellites. In any regard, avoidance angles may be determined in which radiation emission must be maintained at or below a threshold value.

An identifying operation 610 may occur when it is determined that an interference event in which radiation emission from the antenna reaches a threshold value in an avoidance angle. The identifying operation 610 may be conducted in view of ephemeris data received during the analysis operation 608. Moreover, in connection with the identifying operation 610, ephemeris data may also be analyzed to determine options for interference mitigation. For example, in connection with identifying an interference event, it may also be determined if a new target satellite is in view of the satellite antenna and whether re-targeting the satellite antenna to the new target satellite would mitigate interference. It may be appreciated that at a non-GEO user terminal, retargeting the satellite antenna may occur regularly in view of target satellites transitioning out of view from the satellite antenna. Thus, re-targeting to a new target satellite in response to identifying an interference event may comprise an off-schedule transition. The off-schedule transition may correspond to a planned transition that may be performed ahead of schedule to mitigate the interference event. Alternatively, the identifying operation 610 may include identifying a new target satellite that was not previously scheduled for targeting by the satellite antenna in response to identifying the interference event.

The identifying operation 610 may be performed locally at the antenna and/or user terminal or may be conducted remotely. For instance, the scheduler module may be located at the antenna and may be regularly populated with updated with ephemeris data. Thus, the user terminal may autonomously determine a schedule of target satellites including any re-targeting to mitigate interference events and coordinate such schedule directly with the target satellites to maintain continuous communication between the satellite antenna and at least one target satellite. Alternatively, such scheduling may be performed remotely from the user terminal and the schedule may be communicated to the user terminal for execution. Of note, the identifying operation 610 may identify any such interference event prospectively based on forecast ephemeris data for target satellites and non-target satellites before the actual occurrence of the interference event.

Figure 7:
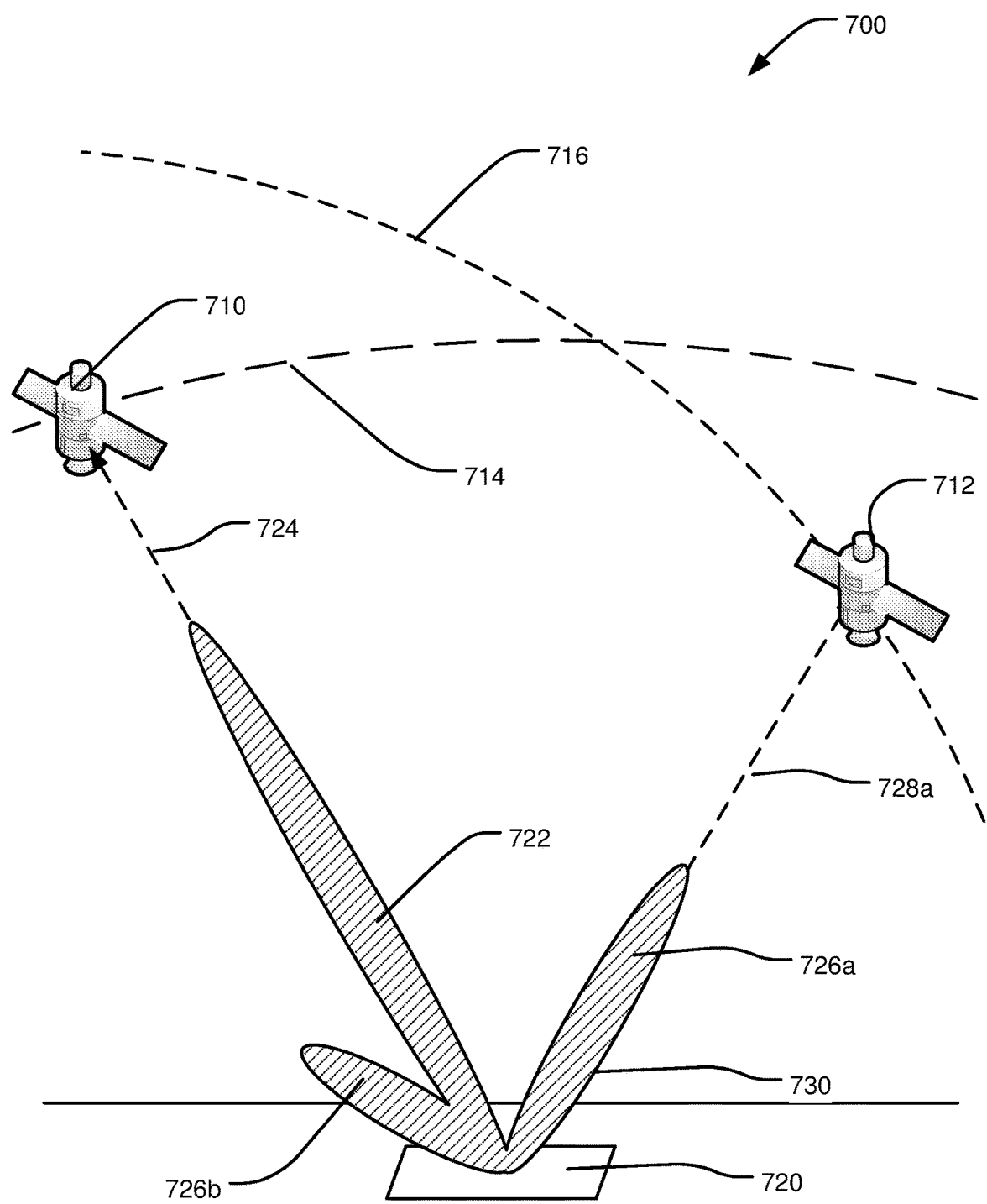
FIG. 7 illustrates an example configuration in which off-axis emissions of a radiation pattern of an electronically steerable satellite antenna may cause an interference event.

Moreover, the interference event may be identified in the identifying operation 610 as relating to the main beam of the satellite antenna or off-axis emissions as noted above. With further reference to FIG. 7, an example scenario 700 is depicted. In FIG. 7, a satellite antenna 720 is steering a main beam 722 of the transmit radiation pattern 730 along a main beam axis 724 in the direction of a target satellite 710. Of note, the main beam axis 724 may be outside of any avoidance angles with respect to either the GEO arc or a non-target satellite. However, the radiation pattern 730 may also have off-axis emissions including a side lobes 726a and 726b. As may be appreciated, side lobe 726b may not be in interference with any non-target satellite. However, side lobe 726a may extend along side lobe axis 728a. As may be appreciated, side lobe axis 728a may be in an avoidance angle relative to non-target satellite 712. Moreover, the magnitude of the radiation emission of the side lobe 726a may reach a threshold value for interference with the non-target satellite 712. Thus, in FIG. 7 an interference event may be identified in relation to the side lobe 726a. In turn, the radiation pattern 730 and/or other transmission characteristic of the antenna 720 may be modified as described below to mitigate the potential interference between the side lobe 726a and the non-target satellite 712.

With returned reference to FIG. 6, in response to the identifying operation 610, a modifying operation 612 may be performed in which a transmission from the satellite antenna is modified. The modifying operation 612 may include re-targeting a new target satellite such that the interference event may be avoided. Such information for alternative target satellites may be provided by a scheduler 330 or the like. Additionally or alternatively, the beam shape of the radiation pattern of the satellite antenna may be modified to avoid interference. This may include modifying the radiation pattern shape and/or power to reduce any radiation directed within an avoidance angle with a non-target satellite below a threshold level.

Figure 8:
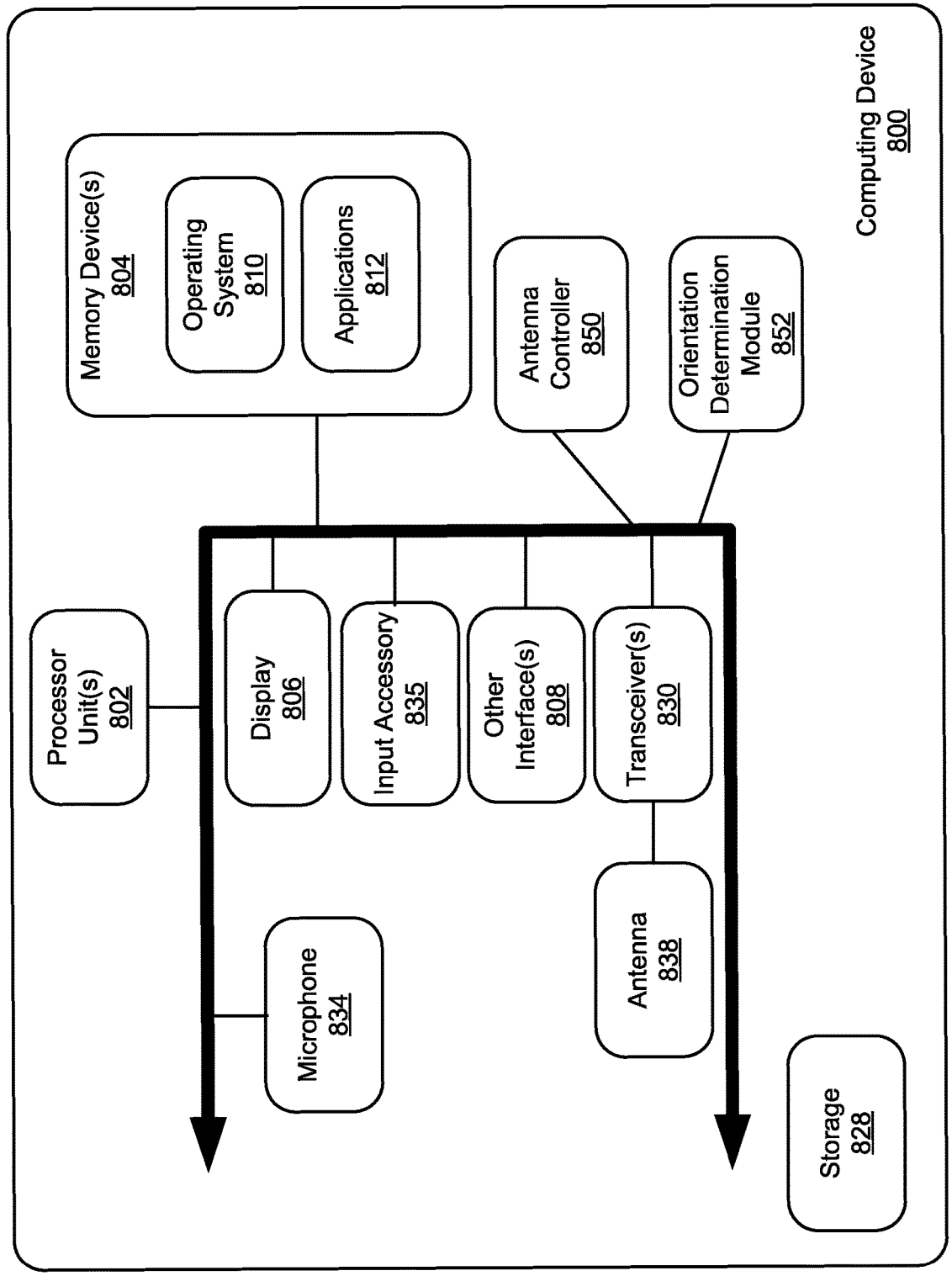
FIG. 8 illustrates an example of a computing device capable of executing certain aspects of the present disclosure.

FIG. 8 illustrates an example schematic of a computing device 800 suitable for implementing aspects of the disclosed technology including an antenna controller 850 and/or an orientation determination module 852 corresponding to the examples described above. The computing device 800 includes one or more processor unit(s) 802, memory 804, a display 806, and other interfaces 808 (e.g., buttons). The memory 804 generally includes both volatile memory (e.g., RAM) and non-volatile memory (e.g., flash memory). An operating system 810, such as the Microsoft Windows® operating system, the Apple macOS operating system, or the Linux operating system, resides in the memory 804 and is executed by the processor unit(s) 802, although it should be understood that other operating systems may be employed.

One or more applications 812 are loaded in the memory 804 and executed on the operating system 810 by the processor unit(s) 802. Applications 812 may receive input from various input local devices such as a microphone 834, input accessory 835 (e.g., keypad, mouse, stylus, touchpad, joystick, instrument mounted input, or the like). Additionally, the applications 812 may receive input from one or more remote devices such as remotely-located smart devices by communicating with such devices over a wired or wireless network using more communication transceivers 830 and an antenna 838 to provide network connectivity (e.g., a mobile phone network, Wi-Fi®, Bluetooth®). The computing device 800 may also include various other components, such as a positioning system (e.g., a global positioning satellite transceiver), one or more accelerometers, one or more cameras, an audio interface (e.g., the microphone 834, an audio amplifier and speaker and/or audio jack), and storage devices 828. Other configurations may also be employed.

The computing device 800 further includes a power supply 816, which is powered by one or more batteries or other power sources and which provides power to other components of the computing device 800. The power supply 816 may also be connected to an external power source (not shown) that overrides or recharges the built-in batteries or other power sources.

In an example implementation, the computing device 800 comprises hardware and/or software embodied by instructions stored in the memory 804 and/or the storage devices 828 and processed by the processor unit(s) 802. The memory 804 may be the memory of a host device or of an accessory that couples to the host. Additionally or alternatively, the computing device 800 may comprise one or more field programmable gate arrays (FPGAs), application specific integrated circuits (ASIC), or other hardware/software/firmware capable of providing the functionality described herein.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for determining a set physical orientation of an electronically steerable satellite antenna for use in a satellite communication system. The method includes determining a location of the electronically steerable satellite antenna relative to Earth. The method also includes receiving a plurality of signals from at least two different respective satellites. The method includes electronically steering a beam of the electronically steerable satellite antenna to determine a direction of incidence of each of the plurality of signals with respect to a boresight direction of to the electronically steerable satellite antenna. In turn, the method includes calculating a set physical orientation of the electronically steerable satellite antenna relative to the Earth based on the location of the electronically steerable satellite antenna and the directions of incidence of each of the signals from the satellites. The satellites from which the plurality of signals are received are in known orbital locations relative to the Earth The set physical orientation comprises an azimuth angle, an elevation angle, and a rotation of the boresight direction of the electronically steerable satellite antenna relative to the Earth.

Implementations may include one or more of the following features. For example, the method may also include determining a beam pattern emission profile for the electronically steerable satellite antenna and associating the beam pattern emission profile to the set physical orientation of the electronically steerable satellite antenna. In an example, the beam pattern emission profile is asymmetric.

In an example the method includes steering the beam of the electronically steerable satellite antenna to communicate a signal between the electronically steerable satellite antenna and a target satellite and detecting an interference event based on the beam pattern emission profile for the electronically steerable satellite antenna in the set physical orientation. The interference event may include emissions from the electronically steerable satellite antenna reaching a predetermined level with respect to a non-target satellite. In an example, the interference event may be based on a side lobe emission apart from a main beam emission of the beam pattern emission profile.

The method may include modifying a transmission of the electronically steerable satellite antenna in response to the interference event. In an example, the interference event may be with respect to a non-target satellite geosynchronous orbit. Additionally or alternatively, an interference event may be with respect to a non-target satellite in low earth orbit.

In an example, the electronically steerable satellite antenna may be a phased array satellite antenna. The determining the direction of incidence of each of the plurality of signals with respect to the boresight direction of the electronically steerable satellite antenna may include electronically steering the beam of the electronically satellite antenna to scan over a range of azimuth angles and a range of elevation angles. The direction of incidence of each of the plurality of signals may be determined based on a signal strength indication of the signal relative to the range of azimuth angles and the range of elevation angles.

In an example, at least one of the two different respective satellites comprises a geosynchronous satellite. In an example, at least one of the two different respective satellites may be a low earth orbit satellite. As such, the known orbital location relative to the Earth may be based on ephemeris data of the low earth orbit satellite at a time reference corresponding to receipt of a signal from the low earth orbit satellite.

In an example, the calculating the set physical orientation may include resolving the azimuth angle, the elevation angle, and the rotation to within not more than about 1 degree of error.

Another general aspect of the present disclosure includes a system operative to determine an orientation of an electronically steerable satellite antenna for use in a satellite communication system. The system includes an electronically steerable satellite antenna. The electronically steerable satellite antenna electronically steers a beam of the electronically steerable satellite antenna to receive a plurality of signals from at least two different respective satellites. The system also includes a location module to determine a location of the electronically steerable satellite antenna relative to Earth. The system further includes an orientation calculation module to determine a direction of incidence of each of the plurality of signals with respect to a boresight direction of the electronically steerable satellite antenna in view of known orbital locations relative to Earth. to the orientation calculation module is further calculates a set physical orientation of the electronically steerable satellite antenna relative to the Earth based on the location of the electronically steerable satellite antenna and the directions of incidence of each of the plurality of signals. The set physical orientation includes an azimuth angle, an elevation angle, and a rotation of the boresight direction of the electronically steerable satellite antenna relative to the Earth.

Implementations may include one or more of the following features. For example the electronically steerable satellite antenna may have a beam pattern emission profile. In turn, the orientation calculation module may associate the beam pattern emission profile to the set physical orientation of the electronically steerable satellite antenna. In an example, the beam pattern emission profile may be asymmetric.

In an example, the electronically steerable satellite antenna may steer the beam of the electronically steerable satellite antenna to communicate a signal between the electronically steerable satellite antenna and a target satellite. The system may include a scheduler to detect an interference event based on the beam pattern emission profile for the electronically steerable satellite antenna in the set physical orientation. The interference event may include emissions from the electronically steerable satellite antenna reaching a predetermined level with respect to a non-target satellite. In an example, the interference event may be based on a side lobe emission apart from a main beam emission of the beam pattern emission profile. The electronically steerable satellite antenna may modify a transmission in response to and prior to the interference event.

In an example, the interference event may be with respect to a non-target satellite in geosynchronous orbit. Additionally or alternatively, an interference event may be with respect to non-target satellite in low earth orbit.

In an example, the electronically steerable satellite antenna may be a phased array antenna. The orientation calculation module may determine the direction of incidence of each of the plurality of signals with respect to the boresight direction of the electronically steerable satellite antenna by electronically steering the beam of the electronically steerable satellite antenna to scan over a range of azimuth angles and a range of elevation angles to identify the direction of incidence. The direction of incidence of each of the plurality of signals may be determined based on a signal strength indication of the plurality of signals relative to the range of azimuth angles and the range of elevation angles.

In an example, at least one of the two different respective satellites comprises a geosynchronous satellite. Additionally or alternatively, at least one of the two different respective satellites may be a low earth orbit satellite and the known orbital location relative to the Earth is based on ephemeris data of the low earth orbit satellite at a time reference corresponding to receipt of a signal from the low earth orbit satellite.

In an example, the orientation calculation module may resolve the azimuth angle, the elevation angle, and the rotation to within not more than about 1 degree of error.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

For the purposes of this disclosure, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth herein are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some examples +/−100%, in some examples +/−50%, in some examples +/−20%, in some examples +/−10%, in some examples +/−5%, in some examples +/−1%, in some examples +/−0.5%, and in some examples +/−0.1% from the specified amount, as such variations are appropriate to perform the disclosed methods.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

What is claimed is:

1. A method for determining a set physical orientation of an electronically steerable satellite antenna for use in a satellite communication system, the method comprising:
   determining a location of the electronically steerable satellite antenna relative to Earth;
   receiving a signal, from each of at least two different respective satellites;
   determining a direction of incidence of each the signal with respect to a boresight direction of the electronically steerable satellite antenna by electronically steering a beam of the electronically steerable satellite antenna; and
   calculating a set physical orientation of the electronically steerable satellite antenna relative to the Earth based on the location of the electronically steerable satellite antenna and the directions of incidence of each of the signals from the satellites, wherein the satellites from which the signals are received are in known orbital locations relative to the Earth, and wherein the set physical orientation comprises an azimuth angle, an elevation angle, and a rotation of the boresight direction of the electronically steerable satellite antenna relative to the Earth;
   wherein determining the direction of incidence of each of the signals with respect to the boresight direction of the electronically steerable satellite antenna comprises electronically steering the beam of the electronically steerable satellite antenna to scan over a range of azimuth angles and a range of elevation angles.

2. The method of claim 1, wherein the electronically steerable satellite antenna comprises a phased array satellite antenna.

3. The method of claim 1, wherein the direction of incidence of each of the signals is determined based on a signal strength indication of the signal relative to the range of azimuth angles and the range of elevation angles.

4. The method of claim 1, wherein at least one of the two different respective satellites comprises a geosynchronous satellite.

5. The method of claim 1, wherein at least one of the two different respective satellites comprises a low earth orbit satellite and the known orbital location relative to the Earth is based on ephemeris data of the low earth orbit satellite at a time reference corresponding to receipt of a signal from the low earth orbit satellite.

6. The method of claim 1, wherein the calculating the set physical orientation comprises resolving the azimuth angle, the elevation angle, and the rotation to within not more than about 1 degree of error.

7. A method for mitigation of interference between an electronically steerable satellite antenna and a non-target satellite, the method comprising:
   determining a location of the electronically steerable satellite antenna relative to Earth;
   receiving a signal from each of at least two different respective satellites;
   determining a direction of incidence of each of the signals with respect to a boresight direction of the electronically steerable satellite antenna by electronically steering a beam of the electronically steerable satellite antenna;
   calculating a set physical orientation of the electronically steerable satellite antenna relative to the Earth based on the location of the electronically steerable satellite antenna and the directions of incidence of each of the signals from the satellites, wherein the satellites from which the signals are received are in known orbital locations relative to the Earth, and wherein the set physical orientation comprises an azimuth angle, an elevation angle, and a rotation of the boresight direction of the electronically steerable satellite antenna relative to the Earth;
   determining a beam pattern emission profile for the electronically steerable satellite antenna;
   associating the beam pattern emission profile to the set physical orientation of the electronically steerable satellite antenna;
   detecting an interference event based on the beam pattern emission profile for the electronically steerable satellite antenna in the set physical orientation, wherein the interference event comprises emissions from the electronically steerable satellite antenna reaching a predetermined level with respect to a non-target satellite; and
   modifying a transmission of the electronically steerable satellite antenna in response to the interference event.

8. The method of claim 7, wherein the beam pattern emission profile is asymmetric.

9. The method of claim 7, further comprising:
steering the beam of the electronically steerable satellite antenna to communicate a signal between the electronically steerable satellite antenna and a target satellite.

10. The method of claim 9, wherein the interference event is based on a side lobe emission apart from a main beam emission of the beam pattern emission profile.

11. The method of claim 9, wherein the interference event is with respect to a non-target satellite geosynchronous orbit.

12. The method of claim 9, wherein the interference event is with respect to a non-target satellite in low earth orbit.

13. A system operative to determine an orientation of an electronically steerable satellite antenna for use in a satellite communication system, comprising:
an electronically steerable satellite antenna, wherein the electronically steerable satellite antenna electronically steers a beam of the electronically steerable satellite antenna to receive a signal from each of at least two different respective satellites;
a location module to determine a location of the electronically steerable satellite antenna relative to Earth; and
an orientation calculation module to determine a direction of incidence of each of the signals with respect to a boresight direction of the electronically steerable satellite antenna in view of known orbital locations of the satellites relative to Earth and to calculate a set physical orientation of the electronically steerable satellite antenna relative to the Earth based on the location of the electronically steerable satellite antenna and the directions of incidence of each of the signals, wherein the set physical orientation comprise an azimuth angle, an elevation angle, and a rotation of the boresight direction of the electronically steerable satellite antenna relative to the Earth;
wherein the orientation calculation module determines the direction of incidence of each of the signals with respect to the boresight direction of the electronically steerable satellite antenna by electronically steering the beam of the electronically steerable satellite antenna to scan over a range of azimuth angles and a range of elevation angles to identify the direction of incidence.

14. The system of claim 13, wherein the direction of incidence of each of the signals is determined based on a signal strength indication of the signal relative to the range of azimuth angles and the range of elevation angles.

15. The system of claim 13, wherein at least one of the two different respective satellites comprises a low earth orbit satellite and the known orbital location relative to the Earth is based on ephemeris data of the low earth orbit satellite at a time reference corresponding to receipt of a signal from the low earth orbit satellite.

16. The system of claim 13, wherein the orientation calculation module resolves the azimuth angle, the elevation angle, and the rotation to within not more than about 1 degree of error.

17. A system operative to mitigate interference between an electronically steerable satellite antenna and a non-target satellite, comprising:
an electronically steerable satellite antenna, wherein the electronically steerable satellite antenna electronically steers a beam of the electronically steerable satellite antenna to receive a signal from each of at least two different respective satellites;
a location module to determine a location of the electronically steerable satellite antenna relative to Earth;
an orientation calculation module to determine a direction of incidence of each of the signals with respect to a boresight direction of the electronically steerable satellite antenna in view of known orbital locations of the satellites relative to Earth and to calculate a set physical orientation of the electronically steerable satellite antenna relative to the Earth based on the location of the electronically steerable satellite antenna and the directions of incidence of each of the signals, wherein the set physical orientation comprise an azimuth angle, an elevation angle, and a rotation of the boresight direction of the electronically steerable satellite antenna relative to the Earth;
wherein the electronically steerable satellite antenna comprises a beam pattern emission profile, and wherein the orientation calculation module associates the beam pattern emission profile to the set physical orientation of the electronically steerable satellite antenna;
a scheduler to detect an interference event based on the beam pattern emission profile for the electronically steerable satellite antenna in the set physical orientation, wherein the interference event comprises emissions from the electronically steerable satellite antenna reaching a predetermined level with respect to the non-target satellite; and
wherein the electronically steerable satellite antenna modifies a transmission in response to the interference event.

18. The system of claim 17, wherein the beam pattern emission profile is asymmetric.

19. The system of claim 17,
wherein the electronically steerable satellite antenna steers the beam of the electronically steerable satellite antenna to communicate a signal between the electronically steerable satellite antenna and a target satellite.

20. The system of claim 19, wherein the interference event is based on a side lobe emission apart from a main beam emission of the beam pattern emission profile.

21. The system of claim 19, wherein the interference event is with respect to a non-target satellite in geosynchronous orbit.

22. The system of claim 19, wherein the interference event is with respect to a non-target satellite in low earth orbit.

23. The system of claim 19, wherein the electronically steerable satellite antenna comprises a phased array antenna.

24. The system of claim 19, wherein at least one of the two different respective satellites comprises a geosynchronous satellite.

* * * * *